United States Patent [19]

Peel, Sr.

[11] 4,036,274
[45] July 19, 1977

[54] SAFETY CAGE FOR TIRE INFLATION

[76] Inventor: Aubrey A. Peel, Sr., Rte. 2, 1505 Nemeth St., Auburndale, Fla. 33823

[21] Appl. No.: 702,719

[22] Filed: July 6, 1976

[51] Int. Cl.² .......................................... B60C 25/00
[52] U.S. Cl. ..................................................... 157/1
[58] Field of Search ............................................. 157/1

[56] References Cited

U.S. PATENT DOCUMENTS

| | | | |
|---|---|---|---|
| 2,407,049 | 9/1946 | Winarsky et al. | 157/1 |
| 2,792,056 | 5/1957 | Ricketts et al. | 157/1 |
| 3,495,647 | 2/1970 | Branick | 157/1 X |

Primary Examiner—Al Lawrence Smith
Assistant Examiner—James G. Smith
Attorney, Agent, or Firm—Duckworth, Hobby, Orman, Allen & Pettis

[57] ABSTRACT

A safety cage for holding a pneumatic tire during inflation is provided in which a framework is formed having a base and a center post protruding therefrom for the placement of a pneumatic tire for inflation of the tire. Side frame members extend from the base member and have top frame members attached thereto which swing over onto the center post where a locking pin locks the top frame members together and to the center post for holding the pneumatic tire mounted on a wheel within the safety cage to prevent injury to a worker during the inflation operation.

9 Claims, 4 Drawing Figures

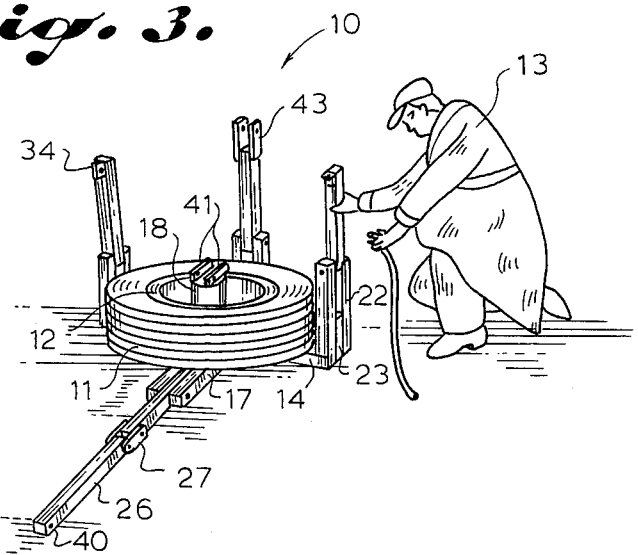
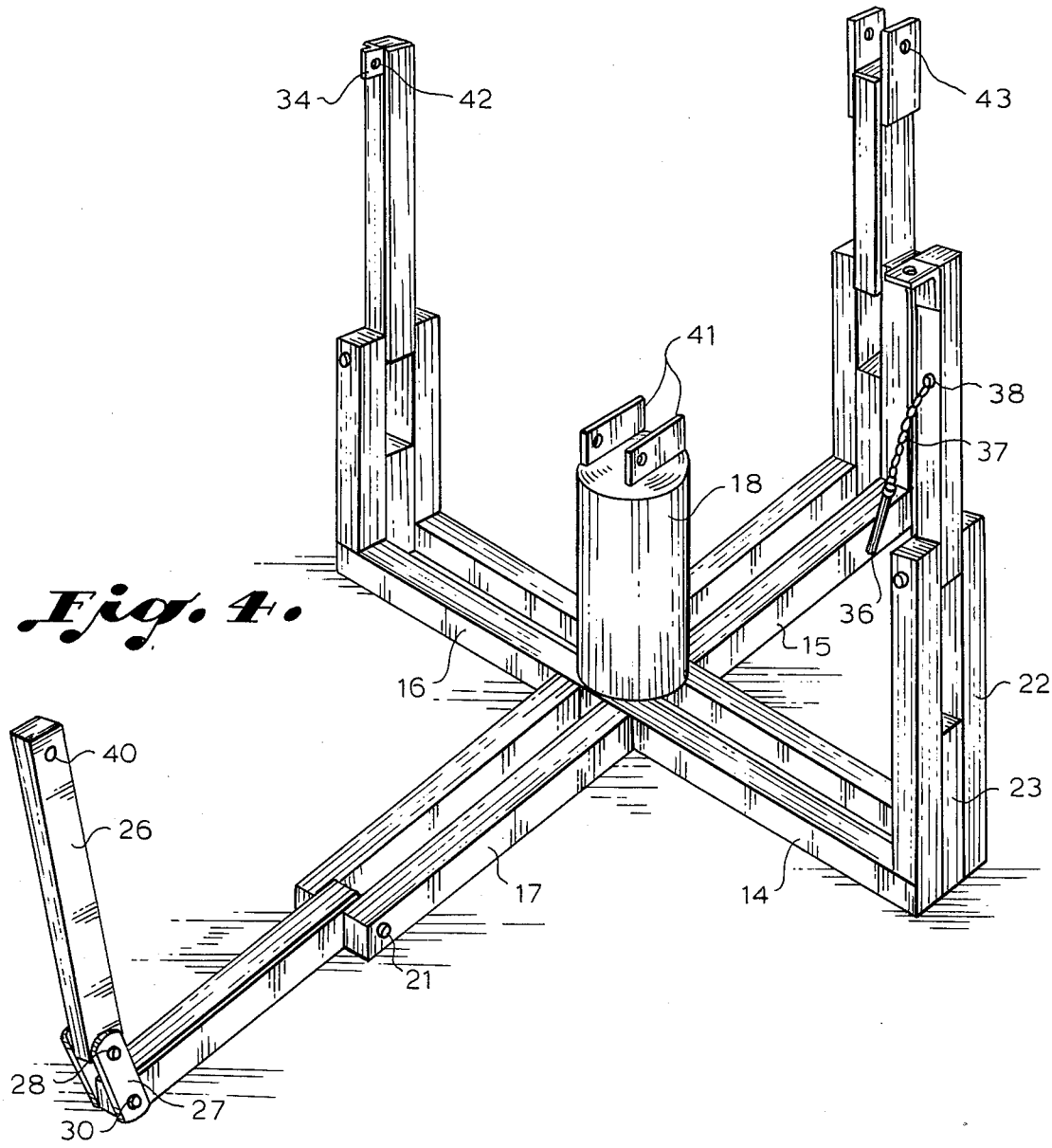

SAFETY CAGE FOR TIRE INFLATION

BACKGROUND OF THE INVENTION

The present invention relates to a safety device for the protection of vehicle tire workers to prevent injury in the event that a tire breaks or disintegrates during the inflation operation by providing a safety cage for locking the tire during the inflation operation.

One of the more precarious and risky operations in the servicing of automotive and truck equipment is the changing and inflation of tires. When a given tire casing has been damaged or has lived its useful life or for any other reason must be removed from the wheel, it is a simple operation to extract the valve stem and permit the air to exhaust from the inner tube whereupon it is a relatively simple operation to remove the casing and tube from the wheel, and it is almost as simple to place a new casing and tube on the same wheel. When, however, air under pressure is forced into the tube to prepare the tire for the road, a considerable danger arises. If there are defects in the casing, which is especially apt to occur when a used casing is replaced on a wheel, or if the baseband is defective, or if the casing is not properly seated on the wheel, when sufficient pressure is reached, the tire may burst or be blown off of the rim. This occurs only after from 20 to 30 pounds of pressure have been built up in the tire, and the result is that the mechanic who is placing the tire is in serious danger of severe injury or even death.

The most dangerous items are the removable ring and the lock ring. These items under the impulse of 20 to 40 pounds air pressure are entirely capable of decapitating an operator. The safety cage of the present invention is especially designed to catch these rings if they are dislodged by air pressure, and prevent injury to the operator. Similarly, a long tear in the fabric of the carcass, or separation of the cords in the carcass, may result in the dislodgment of a considerable sized fragment of tire which under pressures of 20 to 40 pounds per square inch may have sufficient impetus to break arms or ribs, disabling the operator for a considerable time. The homework of the present guard structure are designed to intercept major fragments or tire casing large enough to injure an operator.

The safety cage of the present invention consists of a base or floor frame having a center post protruding therefrom so that a pneumatic tire mounted on a wheel rim can be placed over the center post and enclosed in a cage to prevent the escape of rings during the inflation of the tire. Advantageously, the device allows for the rapid placing and locking of the wheel in the safety cage for the inflation and for the rapid removal upon the completion of the inflation operation.

SUMMARY OF THE INVENTION

The present invention provides a safety cage for placing a pneumatic tire mounted upon a wheel for the inflation of a pneumatic tire. It has a base or floor frame which has a center post member attached thereto and protruding therefrom. Side frame members are attached to the base of the frame and have top frame members attached thereto and mounted to swing over the top of a mounted tire placed over the center post. The top frame members are brought together at the top of the center post and a single locking pin locks the top frame members together for locking the mounted pneumatic tire in the cage to protect an operator during the inflation operation.

BRIEF DESCRIPTION OF THE DRAWINGS

Other objects, features and advantages of the present invention will be apparent from the written description and from the drawings in which:

FIG. 3 is a perspective view of an operator removing a pneumatic tire from the safety cage of the present invention, FIG. 4 is a perspective view of an unlocked and open safety cage in accordance with FIGS. 1 through 3.

DETAILED DESCRIPTION OF THE DRAWINGS

Figure 1:
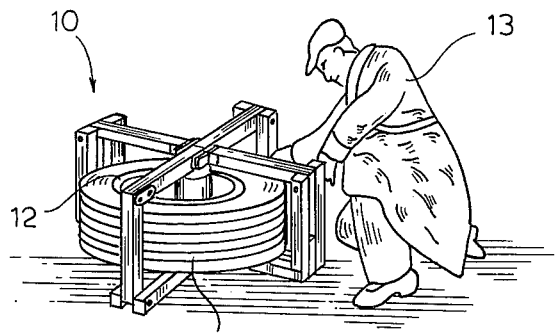
FIG. 1 is a perspective view of an operator inflating a mounted pneumatic tire located in safety cage in accordance with the present invention.
Figure 2:
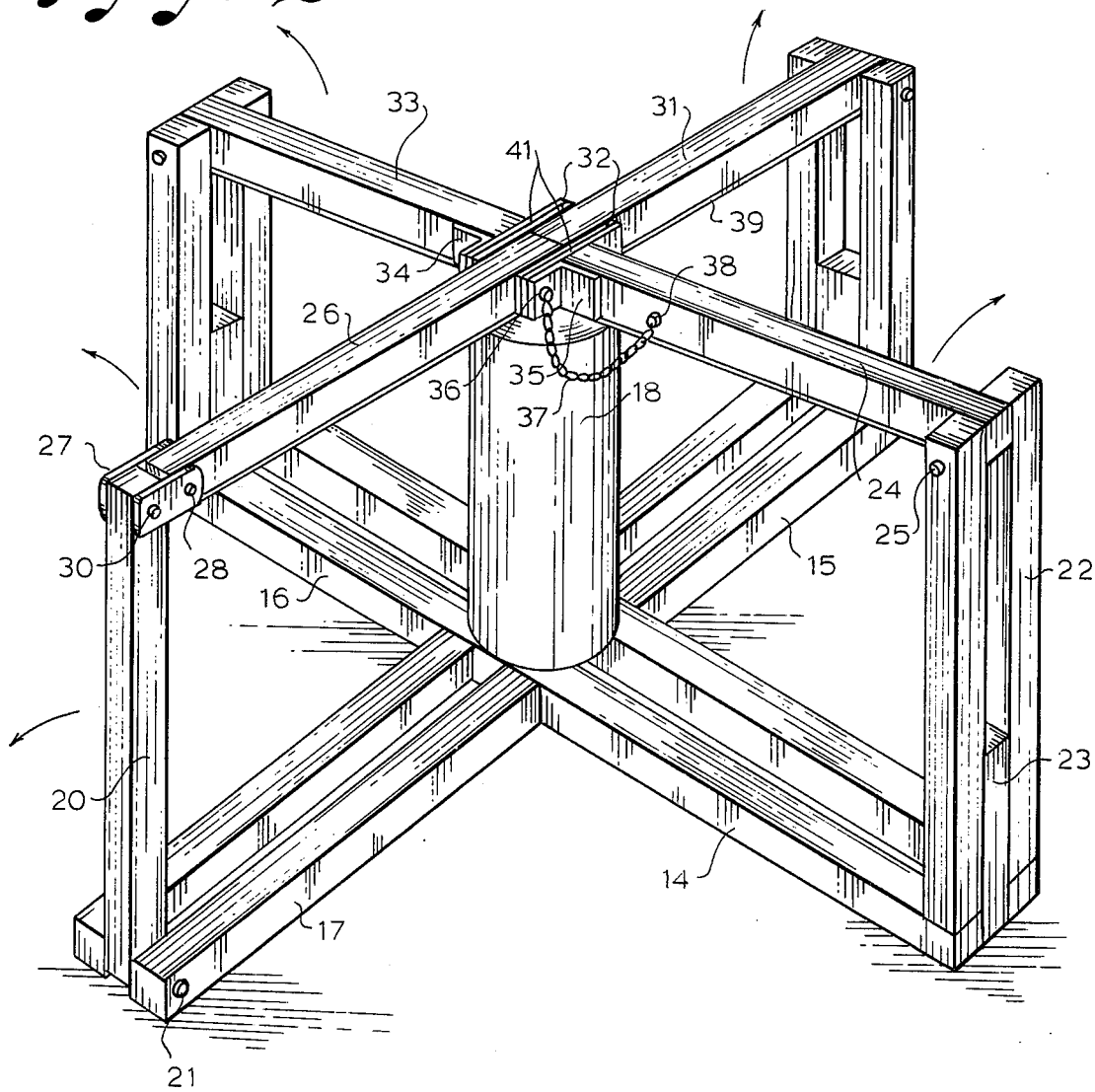
FIG. 2 is a perspective view of the assembled safety cage in accordance with the present invention.

Referring now to FIGS. 1 through 4 of the drawings, a safety cage 10 in accordance with the present invention has a pneumatic tire 11 mounted to a wheel 12 located therein, with an operator 13 inflating the tire 11 in FIG. 1. The safety cage has a plurality of pairs of base or floor members 14, 15, 16 and 17 extending in four directions to form both a base for setting the entire apparatus on the floor and for mounting a center post 18. Center post 17 may be a cylindrical steel pipe or post fixedly welded to the interesecting base frame members 14, 15, 16 and 17. The base members 17 has a single vertically extending side frame member 20 pinned between the pair of members 17 by pin 21 and adapted to swing on the pin 21 while each of the pair of base members 14, 15 and 16 may have identical pairs of side frame members 22 with a center reinforcing member 23 for fixedly attaching the side frame members 22 and 23 to the pairs of base members 14, 15 and 16. Each of the three pair of side members 22 has a top frame member 24 pinned therebetween with a bolt 25 and is adapted to swing on the bolt 25. Vertically extending frame member 20 has a single top frame member 26 connected with a bracket 27 and bolts or pins 28 and 30 for swinging thereon so that side frame member 20 and top frame member 26 may be swung out of the way as illustrated in FIGS. 3 and 4. One top frame member 31 located opposite top frame member 26 has a pair of locking brackets 32 fixedly attached thereto such as by welding, as while each of the top frame members 24 and 33 have a locking member 34 extending perpendicular thereto, and parallel to the locking member 32. In addition, the center post 18 has a pair of locking brackets 35, fixedly attached to the top thereof and mounted so that the locking brackets 34 on top frame members 34 and 33 will fall just inside thereof while the locking braces 32 will fall just inside of the locking members 34 and 33 to form one convenient center section of interconnecting members. Locking members 34 and 32 as well as top frame member 26 all have identical and aligned holes therethrough so that a locking pin 36 attached to a chain 37 and connected at 38 to the top frame member 24 which can be easily slid into the openings in the locking members 32, 34 and top frame member 26 for locking all of the top frame members together to the center post 18. An opening 40 can be seen in top frame member 26 of FIG. 4 while openings 41 can be seen in the brackets 35 of the center post 18 and openings 42 in the locking members 34 with one opening 43 in each of the pair of locking members 32. In a typical safety cage the entire framework can be made of steel channels, a cylindrical steel pipe 18, and steel brackets and locking members even though it should be clear that other metals or materials can be used to make the safety cage without departing from the spirit and scope of the invention. Steel reinforcing bars 39 are welded to the bottom side of top frame members 24, 31, 33 and 26 to accept the blow of an exploding tire ring to prevent further damage to the frame.

In operation the open cage 10 as illustrated in FIG. 4 has a tire mounted on a wheel placed over the center post 18 and each of the top frame members 24, 31 and 33 folded together with the side frame member 20 folded to a vertical position so that the top frame member 26 can be folded onto the center post 18 so that all top frame members fall into alignment onto the center post with the locking bracket 41 and the locking pin 36 slid through the openings for locking the mounted tire 11 in the cage. The operator 13 can then inflate the tire while the removal ring and lock ring are safely held within the locking cage in the event the pneumatic tire burst from the wheel. It will of course be clear that different shapes and sizes can be used for the face members, side members, top members, as well as center posts without departing from the scope of the invention and that different locking and connecting members can be utilized. Accordingly, the present invention is not be be construed as limited to the particular forms shown herein which are to be considered illustrative rather than restrictive.

I claim:

1. Safety cage for placing a pneumatic tire during inflation comprising in combination:
   a base frame;
   a center post member attached to said base frame and protruding therefrom, said center post member having a locking bracket fixedly attached thereto;
   side frame members attached to said base frame in a spaced relationship to said center post member;
   top frame members attached to said side frame members and movable toward said center post member in one position and movable to a second position to allow a pneumatic tire around said center post member, each said top frame member having a locking member mounted thereon for locking to said locking bracket fixedly attached to said center post member.

2. The apparatus in accordance with claim 1 in which each said top frame member is swingably attached to at least one said side frame member allowing said top frame member to swing away from said center post member when mounting a tire on said center post.

3. The apparatus in accordance with claim 1 in which said locking brackets attached to said center post and said locking members attached to said top frame members each have openings therein for sliding a locking pin for locking said members together and to said center post brackets.

4. The apparatus in accordance with claim 3 in which said locking pin is attached to a flexible holding member at one end which flexible holding member is attached to one said top member.

5. The apparatus in accordance with claim 4 in which one said side member is swingably mounted to one said base frame member for swinging said side member and its attached top frame member out of the way during the placing of a mounted tire on said center post.

6. The apparatus in accordance with claim 5 in which said base frame includes four pairs of steel frame members with a cylindrical center pipe welded to the intersection of said pairs of base frame members.

7. The apparatus in accordance with claim 6 in which two said top frame members have perpendicular locking members extending therefrom having an opening therethrough and one said top frame member has a pair of locking members extending therefrom having an opening therethrough which aligns with the openings in said pair of perpendicular extending locking members on said pair of top frame members and said locking brackets attached to said center post member having openings therein which align with openings on said top frame members locking members whereby said removable locking pin can extend through said locking brackets and locking members for locking said top frame members together.

8. The apparatus in accordance with claim 7 in which one said top frame member has an opening therethrough which aligns over said center post member with the openings in said locking brackets attached to said center post and said other locking members attached to said other top frame members for locking said top frame members together with said locking pin.

9. The apparatus in accordance with claim 8 in which three of said side frame members are mounted in pairs to said base frame and each have a top frame member held therebetween with a bolt for swinging thereon.

* * * * *